United States Patent
Tsirkin (10) Patent No.: US 9,720,722 B2
(45) Date of Patent: Aug. 1, 2017

(54) HYPERVISOR DRIVEN GRADUAL BALLOON INFLATION

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 14/844,220

(22) Filed: Sep. 3, 2015

(65) Prior Publication Data

US 2017/0068554 A1 Mar. 9, 2017

(51) Int. Cl.
| | |
|---|---|
| G06F 9/455 | (2006.01) |
| G06F 9/46 | (2006.01) |
| G06F 21/00 | (2013.01) |
| G06F 9/50 | (2006.01) |
| G06F 3/06 | (2006.01) |

(52) U.S. Cl.
CPC ...... *G06F 9/45558* (2013.01); *G06F 9/45545* (2013.01); *G06F 9/5016* (2013.01); *G06F 3/0619* (2013.01); *G06F 2009/4557* (2013.01); *G06F 2009/45583* (2013.01)

(58) Field of Classification Search
CPC ............. G06F 9/45558; G06F 9/45545; G06F 9/5016; G06F 2009/4557; G06F 2009/45583; G06F 3/0619; G06F 3/0604; G06F 3/064; G06F 3/0631; G06F 2212/657; G06F 3/0608; G06F 3/0638
USPC .......................................... 718/1, 104; 711/6
See application file for complete search history.

(56) References Cited

U.S. PATENT DOCUMENTS

| | | | | |
|---|---|---|---|---|
| 7,433,951 B1 * | 10/2008 | Waldspurger | ......... | G06F 9/5016 709/223 |
| 8,296,761 B2 * | 10/2012 | Ueno | .................. | G06F 11/3423 718/1 |
| 8,695,007 B2 * | 4/2014 | Wada | .................. | G06F 9/45533 713/300 |
| 8,738,868 B2 | 5/2014 | Tuch et al. | | |
| 8,943,260 B2 | 1/2015 | Ben-Yehuda et al. | | |
| 8,959,512 B2 | 2/2015 | Dahlstedt | | |
| 9,015,203 B2 | 4/2015 | Corrie | | |

(Continued)

OTHER PUBLICATIONS

Fastvue, Understanding Hyper-V CPU Usage (Physical and Virtual), Aug. 15, 2013, pp. 1-19.*

(Continued)

*Primary Examiner* — H S Sough
*Assistant Examiner* — Phuong N Hoang
(74) *Attorney, Agent, or Firm* — K&L Gates LLP (57) ABSTRACT

A hypervisor determines a target CPU usage of a virtual machine in responding to a request to allocate guest memory. Then the hypervisor receives a first balloon request for a first quantity of guest memory to be ballooned. The hypervisor transmits a second balloon request for guest memory to be allocated to a balloon of the virtual machine, where the second quantity of guest memory is a first fraction of the first quantity of guest memory. The hypervisor then determines a first quantity of time that the virtual machine took to execute the second balloon request and waits a second quantity of time. The hypervisor then transmits a third balloon request for a third quantity of guest memory to be allocated to the balloon of the virtual machine, where the third quantity of guest memory is a second fraction of the first quantity of guest memory.

20 Claims, 6 Drawing Sheets

(56) References Cited

U.S. PATENT DOCUMENTS

| | | | |
|---|---|---|---|
| 2008/0184227 A1* | 7/2008 | Matsumoto | G06F 9/45533 718/1 |
| 2011/0179417 A1* | 7/2011 | Inakoshi | G06F 9/45558 718/1 |
| 2012/0036325 A1* | 2/2012 | Mashtizadeh | G06F 12/0802 711/118 |
| 2012/0124270 A1* | 5/2012 | Weissman | G06F 12/023 711/6 |
| 2012/0290765 A1 | 11/2012 | Durrant | |
| 2013/0290596 A1 | 10/2013 | Corrie | |
| 2013/0290641 A1 | 10/2013 | Corrie | |
| 2013/0339568 A1 | 12/2013 | Corrie | |

OTHER PUBLICATIONS

Parameswaran, "Virtualization in System p", Nov. 13, 2007, pp. 1-12.*

Hines et al., "Post-Copy Live Virtual Machine Migration Using Adaptive Pre-Paging and Dynamic Self-Ballooning", Computer Science, Binghamton University, Mar. 11-13, 2009 (10 pages).

Understanding Memory Resource Management in VMware ESX Server, www.vmware.com/files/pdf/perf-vsphere-memory_management.pdf (20 pages).

* cited by examiner

FIG. 1

| Extended Page Table 182 | | | |
|---|---|---|---|
| 210A x0001 | 220A Present | 230A Read-Write | 240A Address of Unallocated Memory x01AF |
| 210B x0002 | 220B Present | 230B Executable Only | 240B Address of Unallocated Memory x01FF |
| 210C x0003 | 220C Non-present | 230C Executable | 240C Address of Memory Allocated to App 198A x024F |
| 210D x0004 | 220D Non-present | 230D Read Only | 240D Address of Memory Allocated to App 198B x029F |

Page Entry 200A
Page Entry 200B
Page Entry 200C
Page Entry 200D

HYPERVISOR DRIVEN GRADUAL BALLOON INFLATION

BACKGROUND

The present disclosure relates generally to memory management of virtual machines, and more particularly to ballooning with assigned devices. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides a new and innovative system, methods and apparatus for hypervisor driven gradual balloon inflation.

An example system comprises one or more physical processors, a hypervisor executing on the one or more physical processors, and a virtual machine, including a guest operating system (OS), executing on the one or more physical processors. The hypervisor determines a target CPU usage of the virtual machine in responding to a request to allocate guest memory. The hypervisor then receives a first balloon request, where the first balloon request requests a first quantity of guest memory to be ballooned. The hypervisor transmits a second balloon request, where the second balloon request requests a second quantity of guest memory to be allocated to a balloon of the virtual machine, where the second quantity of guest memory is a first fraction of the first quantity of guest memory. Then the hypervisor determines a first quantity of time that the virtual machine took to execute the second balloon request and waits a second quantity of time, where the second quantity of time is approximately equal to the first quantity of time divided by the target CPU usage. The hypervisor then transmits to the virtual machine, a third balloon request, where the third balloon request requests a third quantity of guest memory to be allocated to the balloon of the virtual machine, where the third quantity of guest memory is a second fraction of the first quantity of guest memory.

Additional features and advantages of the disclosed method and apparatus are described in, and will be apparent from, the following Detailed Description and the Figures.

DETAILED DESCRIPTION OF EXAMPLE EMBODIMENTS

Figure 1:
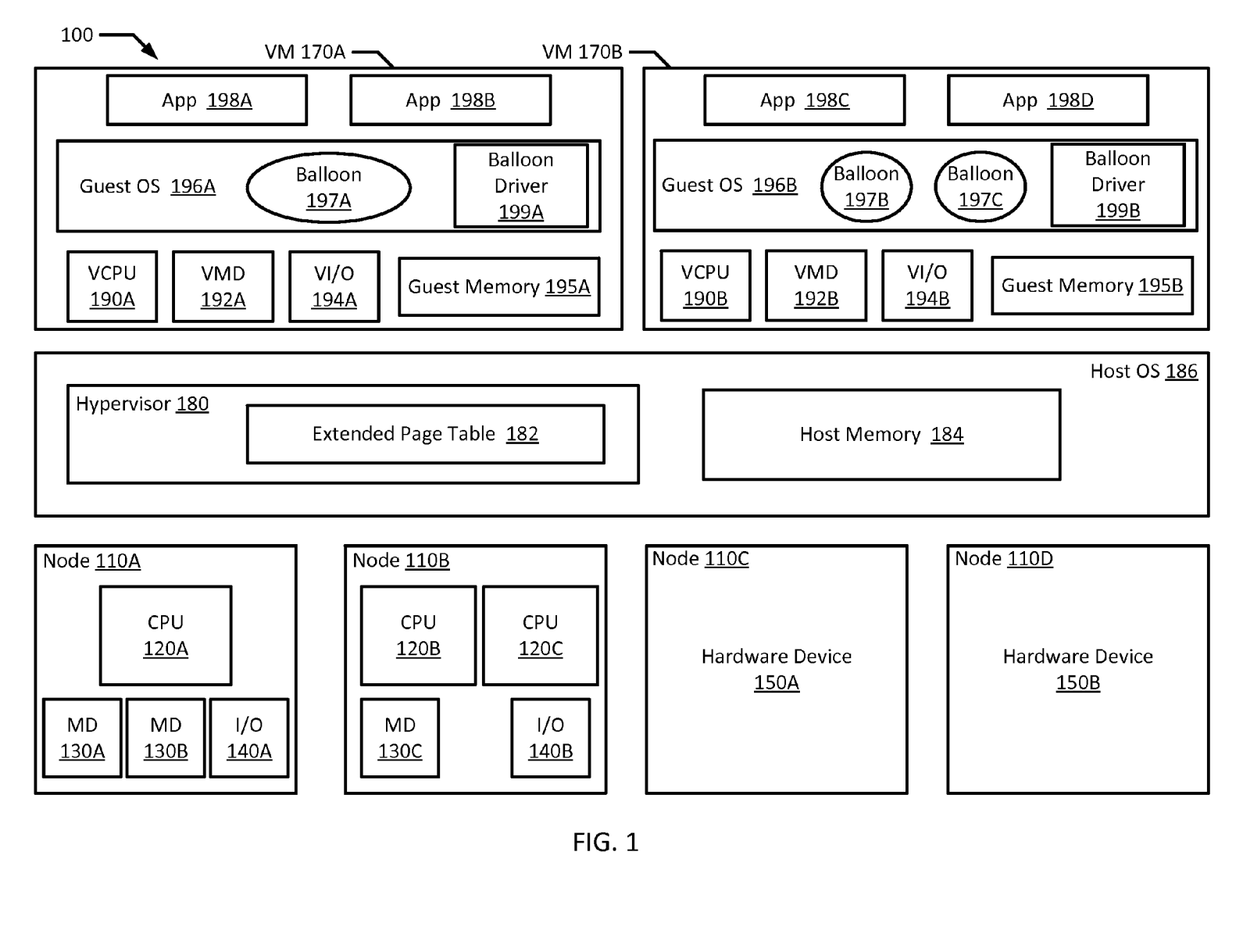
FIG. 1 is a block diagram of an example multiprocessor computer system according to an example embodiment of the present disclosure.

FIG. 1 depicts a high-level component diagram of an example multiprocessor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-B as devices, including virtual processors (e.g., VCPU 190A-B), virtual memory devices (e.g., VMD 192A-B), and/or virtual I/O devices (e.g., VI/O 194A-B).

In an example embodiment, a virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B under the guest operating system 196A-B. In an example embodiment, a virtual machine 170A-B may include multiple virtual processors (VCPU) 190A-B. Processor virtualization may be implemented by the hypervisor 180 scheduling time slots on one or more physical processors 120A-C such that from the guest operating system's perspective those time slots are scheduled on a virtual processor 190A-B.

In an example embodiment, the guest operating system 196A may use a memory balloon 197A to temporarily make guest memory 195A available to a host operating system 186, a guest OS 196A-B process, a host OS 186 process, a guest application 198A-D, a host application, a guest device (e.g., VCPU 190A-D, VMD 192A-B, VI/O devices 194A-D, etc.), a host device (e.g., CPU 120A-C, MD 130A-C, I/O 140A-B, etc.), a different guest OS 196B, a different virtual machine 170B, or a different host OS (not illustrated) by allocating a portion of the guest memory 195A to the memory balloon 197A. In an example embodiment, each guest operating system 196B may include multiple balloons 197B-C, where each balloon 197B-C manages memory pages or memory segments of a different size. For example, memory balloon 197B may gather segments of guest memory 195B to provision requests for 512 kB sized memory and memory balloon 197C may gather segments of guest memory 195B to provision requests for 1 MB sized memory. The memory balloons 197A-C may be managed by a balloon driver 199A-B.

The hypervisor 180 manages host memory 184 for the host operating system 186 as well as memory allocated to the virtual machines 170A-B and guest operating systems 196A-B such as guest memory 195A-B provided to guest OS 196A-B. Host memory 184 and guest memory 195A-B may be divided into a plurality of memory pages that are managed by the hypervisor 180. As discussed below, guest memory 195A-B allocated to the guest OS 196A-B are mapped from host memory 184 such that when a guest application 198A-D uses or accesses a memory page of guest memory 195A-B it is actually using or accessing host memory 184.

The hypervisor 180 may keep track of how each memory page is mapped, allocated, and/or used through the use of one or more extended page tables 182. In this manner, the hypervisor 180 can prevent memory allocated to one guest OS 196A from being inappropriately accessed and/or modified by another guest OS 196B, the host OS 186, or an unauthorized application, process, or device. Similarly, the hypervisor 180 can prevent memory assigned to or being used by one application 198A from being used by another application 198B.

To accommodate a changing demand for memory by the virtual machines 170A-B and host operating system 186, the hypervisor 180 uses memory balloons 197A-B and balloon drivers 199A-B to change the amount of memory allocated between a guest OS 196A-B and a host OS 186. The process of memory ballooning is described in greater detail with reference to FIGS. 5 and 6.

Figure 2:
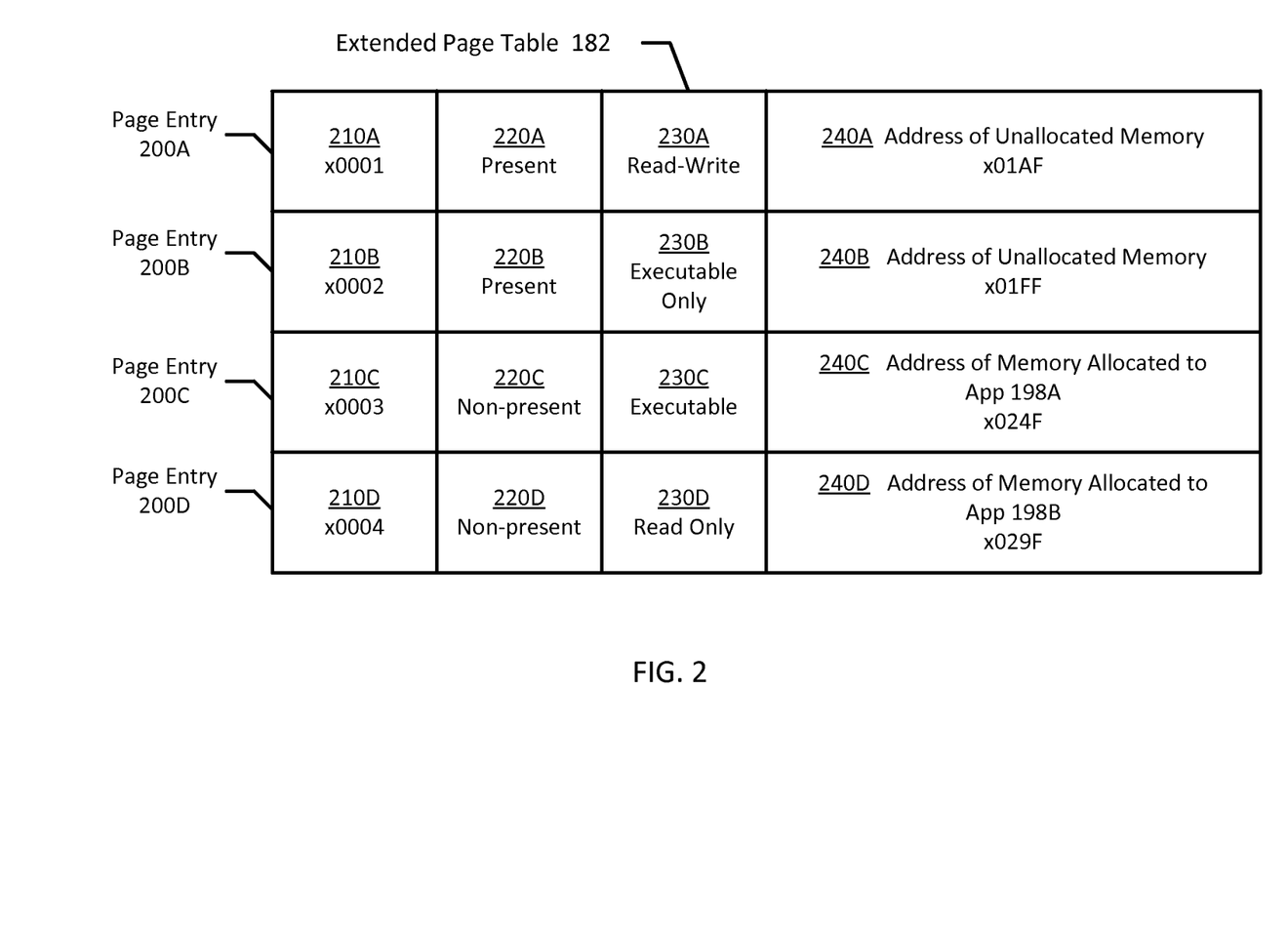
FIG. 2 a block diagram of an example extended page table according to an example embodiment of the present disclosure.
Figure 3:
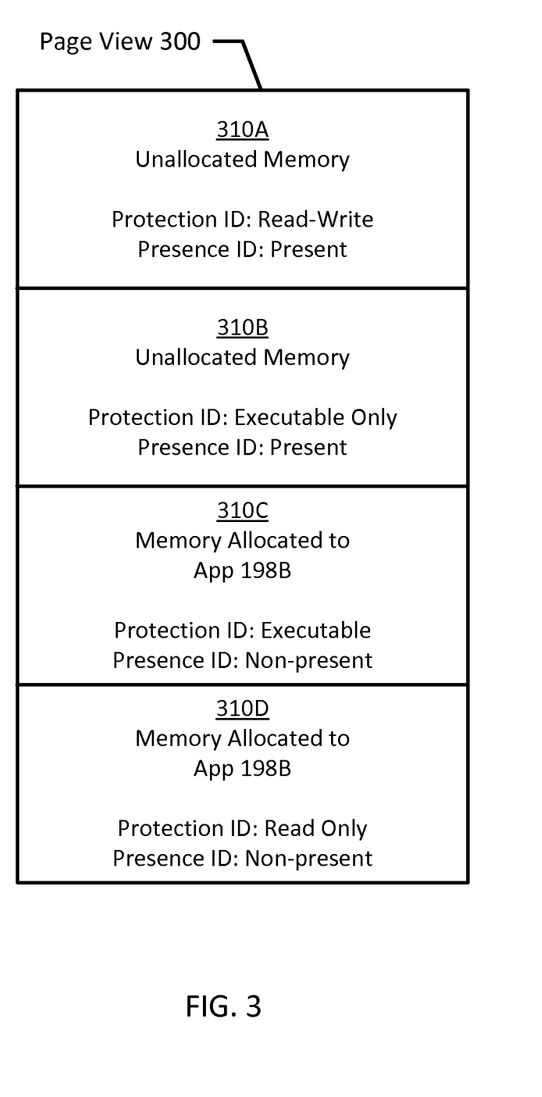
FIG. 3 is a block diagram of example page views and pages according to an example embodiment of the present disclosure.

FIG. 2 illustrates an extended page table (otherwise referred to as a page table) 182 according to an example embodiment of the present disclosure. In general, the hypervisor 180 manages the memory usage of the VMs 170A-B. Both virtual memory and physical memory may be divided into pages 310A-D which are identified with a unique number (e.g., Page Frame Number (PFN) 210A-D). Example embodiments of pages 310A-D and page views 300 are described in greater detail below and as shown in FIG. 3.

A page table 182 is a data structure used by the hypervisor 180 to store a mapping of memory addresses of the guest OS 196A-B to memory addresses of the host OS 186. Accordingly, address translation is handled using page tables 182.

The extended page table 182 comprises page entries 200A-D that map PFN 210A-D (e.g., an address of the guest OS 196A-B) with an address 240A-D (e.g., an address of the host OS 186). Page tables 182 may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL Extended Memory 64 Technology mode, etc.). In an example embodiment, page tables 182 may include presence identifiers 220A-D and protection identifiers 230A-D that indicate an access status for each of the pages 310A-D.

In an example embodiment, page tables 182 may include a presence identifier 220A-D. The presence identifier 220A-D indicates an access status of a page 310A-D corresponding to the page entry 200A-D of the page table 182. For example, a presence identifier 220A-D may used to define that a given page 310A-D is present (or accessible) or non-present (or inaccessible). For example, as illustrated in the example embodiment in FIG. 2, the page 310A corresponding to page entry 200A, PFN 210A address (x0001), address 340A (x01AF), and presence identifier 220A has been defined in page table 182 as 'Present'. The hypervisor 180 may be used to modify a presence identifier 220A-D of pages 310A-D.

In an example embodiment, page tables 182 may include a protection identifier 230A-D. The protection identifier 230A-D indicates the access status of a page 310A-D corresponding to the page entry 200A-D of the page table 182. For example, a protection identifier 230A-D may be used to define that a given page 310A-D is writable (or read-write), write-protected (or read-only), executable (or executable and readable), executable only, etc. For example, as illustrated in the example embodiment in FIG. 2, the page 310A corresponding to page entry 200A, PFN 210A address (x0001), address 340A (x01AF), and protection identifier 230A has been defined in page table 182 as 'Read-Write'. The hypervisor 180 may be used to modify a protection identifier 230A-D of pages 310A-D. In addition, in an example embodiment, the page table 182 may include additional information not shown in FIG. 2 including statistics information, background information, dirty identifiers which indicate that modifications to a page must be written back to disk, etc.

In an example embodiment, one or more page tables 182 may be maintained by the hypervisor 180 which map guest OS 196A-B addresses to host OS 186 addresses that are accessible by the hypervisor 180, VMs 170, guest OS 196A-B, Host OS 186, and/or Host OS 186 resources. The sizes of different page tables may vary and may include more or fewer entries than are illustrated in FIG. 2.

FIG. 3 illustrates page view 300 and pages 310A-D in accordance with an example embodiment of the present disclosure. As noted above, a page 310A-D may be a portion of physical or virtual memory designated for storing data. As used herein, a page view 300 denotes a mapping from addresses designated for use by VM 170A-B to host OS 186 addresses. In an example embodiment, the page view 300 may denote the mapping from PFNs of a VM 170A-B to host OS 186 addresses, as used during normal execution of the VM 170A-B. As illustrated in FIG. 3, pages 310A-D may be defined by presence identifiers such as 'Non-present' and protection identifiers such as 'Read-Only' in accordance with their respective page table 182 presence identifiers (e.g., 220D) and protection identifiers (e.g., 230D).

Figure 4:
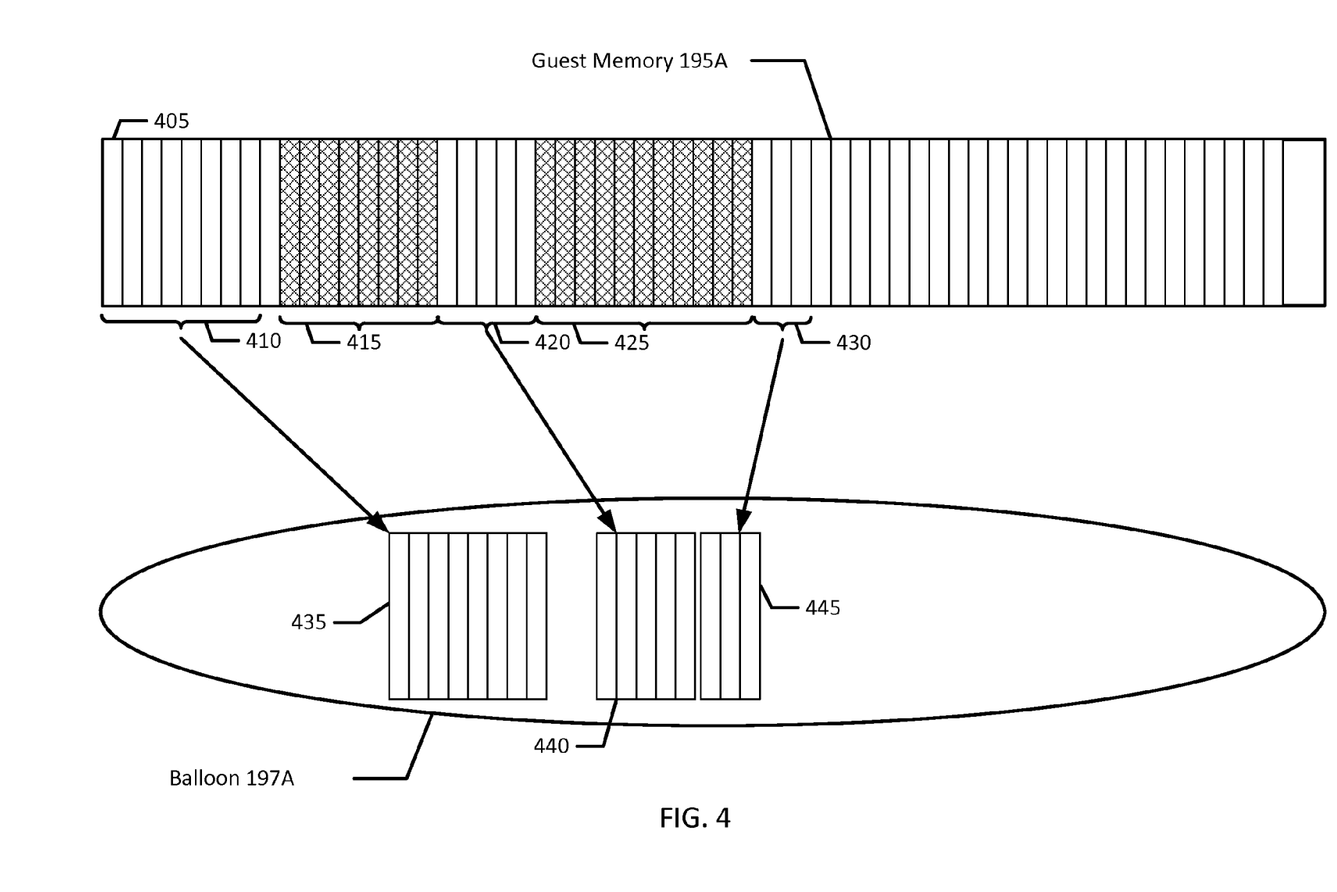
FIG. 4 is a block diagram of example guest memory and balloon according to an example embodiment of the present disclosure.

FIG. 4 illustrates guest memory and a balloon according to an example embodiment of the present disclosure. The guest memory 195A is divided into memory pages to facilitate the management of memory by the hypervisor 180. In the illustrated example embodiment, the block of pages 410 constitute eight pages of contiguous memory. On the other hand, the block of pages 420 (five pages of contiguous memory) and the block of pages 430 (three pages of contiguous memory) taken together constitute eight pages of non-contiguous memory. The illustrated cross-hatched sections of memory (e.g. segments 415 and 425) denote memory that is presently being used (e.g. by an application 198A-D to store and/or access data) and the illustrated white sections of memory (e.g. segments 410, 420, and 430) denote memory that is available to be used and/or allocated. For example, block 420 (consisting of 5 guest pages) is available to be allocated from the guest OS 196A to the host OS 186 upon request.

A hypervisor 180 may request that a block of guest memory 195A of a specified size (e.g., a number of guest pages or guest memory 195A of a particular size) be allocated to the balloon 197A. For example, in the illustrated example embodiment, the hypervisor 180 may request that eight guest pages be allocated to the balloon 197A. Responsive to such a request, the guest OS 196A (via the balloon driver 199A) may, for example, allocate a block of eight contiguous guest pages (e.g., 410) to the balloon 197A (e.g., 435). In another example embodiment, the guest OS 196A (via the balloon driver 199A) may allocate multiple blocks of eight non-contiguous guest pages (e.g., 420 and 430) to the balloon 197A (e.g., 440 and 445). One of ordinary skill would appreciate that the size of ballooning requests and the size of guest memory blocks allocated to a balloon 197A may vary.

In an example embodiment, the virtual machine 170A allocates unused guest memory pages (e.g., 410, 420, 430) to a balloon 197A by first identifying unused blocks (e.g., 410, 420, 430) of guest memory 195A that are the size of the requested quantity of guest memory 195A. As used herein, unused memory refers to memory that is not presently assigned to, used, and/or accessed by an application 198A-D, device (e.g., VCPU 190A-B, VMD 192A-B, VI/O 194A-B), or other process of a guest OS 196A-B or host OS 186. Once such unused blocks (e.g., 410, 420, 430) of guest memory 195A are identified, the virtual machine 170A then places the identified blocks (e.g., 410, 420, 430) of unused guest memory 195A into the balloon 197A (e.g., 435, 440, 445). As more guest memory pages (e.g., 410, 420, 430) are placed in the balloon 197A (e.g., 435, 440, 445), the balloon 197A inflates. In placing the guest memory pages (e.g., 410, 420, 430) into the balloon 197A (e.g., 435, 440, 445), the virtual machine 170A releases these memory pages (e.g., 410, 420, 430) for use by the requesting module and further, the virtual machine 170A refrains from using these allocated guest memory pages (e.g., 410, 420, 430) while these pages are in the balloon 197A.

In an example embodiment, once the virtual machine 170A executes the request to inflate the balloon 197A, it may respond to the hypervisor 180 with an indication that the request has been executed. In an example embodiment, once the virtual machine 170A executes the request to inflate the balloon 197A, it may respond to the hypervisor 180 with at least one of an address of the ballooned guest memory 195A and an indication of the size of the ballooned guest memory 195A. In an example embodiment, the virtual machine 170A transmits an address for each contiguous unused block (e.g., 410, 420, and 430) of guest memory 195A that has been allocated by the virtual machine 170A. In an example embodiment, the virtual machine 170A also transmits at least one indicator of the size of the guest memory 195A that has been allocated. For example, the virtual machine 170A may transmit, in addition to a beginning address, the size (e.g., a number of host pages, a size of memory in bytes, or an offset) of each block (e.g., 415 and/or 435) of guest memory 195A that has been allocated by the guest OS 196A.

The virtual machine 170A may designate the memory pages (e.g., 410, 420, 430) that are placed in the balloon 197A as unavailable and will not allow any applications 198A-B, devices (e.g., VCPU 190A, VMD 192A, VI/O 194A), or other processes of the virtual machine 170A to use the allocated memory pages (e.g., 415 and 435) until they are removed from the balloon 197A. In an example embodiment, the host OS 180 may use the allocated blocks of guest memory 195A for its own processes. In an example embodiment, the host OS 180 may make the allocated blocks of guest memory 195A available for use by other guest operating systems (e.g., guest OS 196B).

Figure 5:
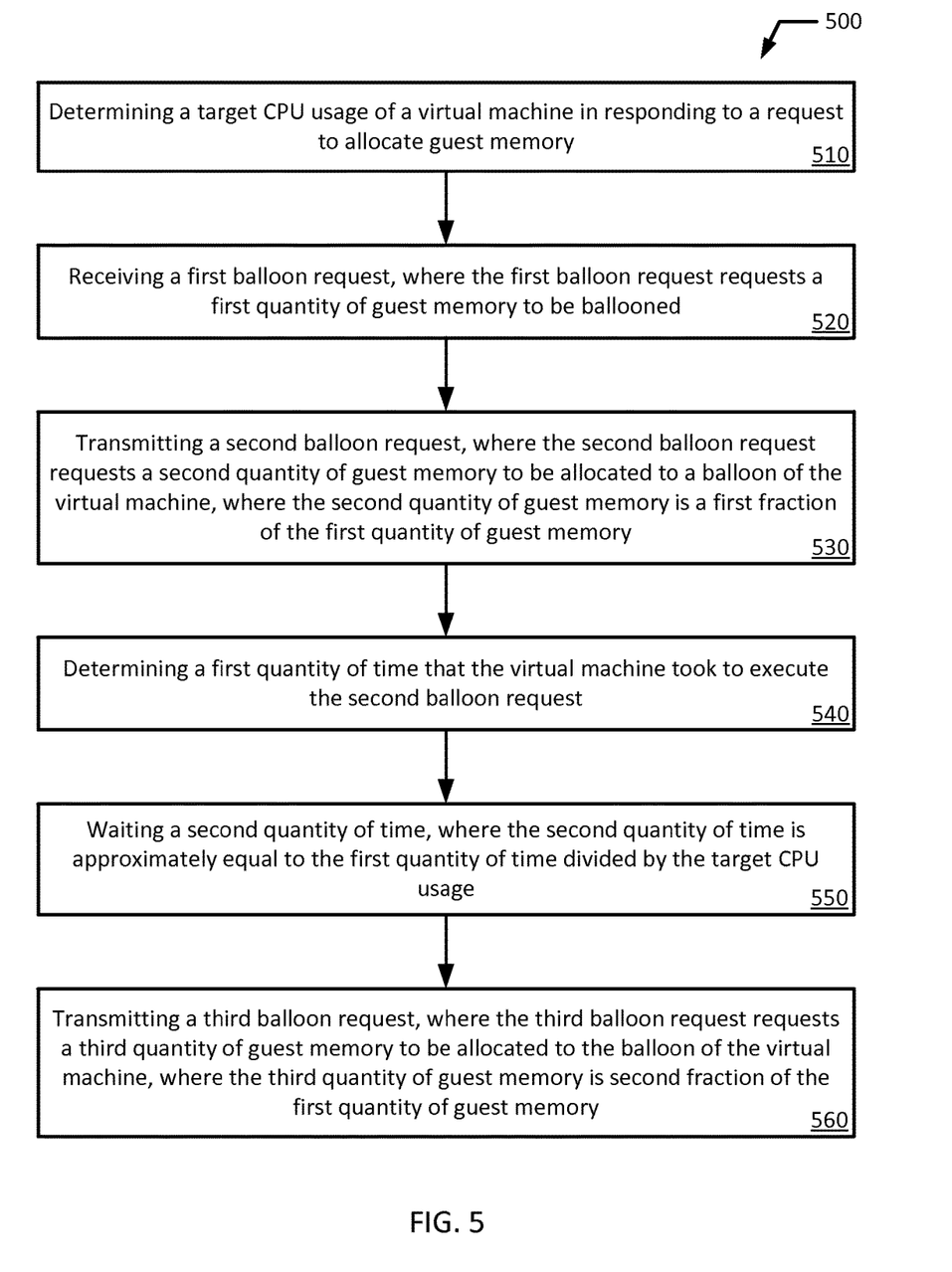
FIG. 5 is a flowchart illustrating an example process for hypervisor driven gradual balloon inflation according to an example embodiment of the present disclosure.

FIG. 5 illustrates a flowchart of an example method 500 for hypervisor driven gradual balloon inflation. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example embodiment, the method is performed by a hypervisor 180.

The example method 500 starts and a hypervisor 180 determines a target CPU usage of a virtual machine 170A in responding to a request to allocate guest memory 195A (block 510). As used herein, CPU usage refers to a percentage of overall CPU time (otherwise referred to as 'execution time') spent executing a particular task or set of tasks. For example, the CPU usage for allocating guest memory 195A refers to the percentage of CPU time spent allocating guest memory 195A. In another example, the CPU usage for executing a ballooning request refers to the percentage of CPU time spent executing the ballooning request (for example, allocating guest memory 195A and then passing it to a balloon 195A). For example, if the VCPU 190A of virtual machine 170A takes 2 milliseconds (ms) of a 10 ms period to execute a single ballooning request, then the CPU usage of that ballooning request is 20%. A target CPU usage for a particular task or set of tasks may be defined by a user or system administrator. For example, a system administrator may define the target CPU usage of executing a single ballooning request should be 10%. In that case, for every 10 ms of CPU time, the VCPU 190A should spend no more than 1 ms executing a balloon request. Similarly for every 50 ms of CPU time, the VCPU 190A should spend no more than 5 ms of CPU time executing a ballooning request.

In an example embodiment where a virtual machine 170A has one or more VCPUs 190A capable of parallel processing, the target CPU usage for executing a request to allocate guest memory 195A to a balloon 197A may be the percentage of CPU time that the one or more VCPUs 190A of the virtual machine 170A as a whole should spend in executing the request to allocate the guest memory 195A. In another example embodiment where a virtual machine 170A has one or more VCPUs 190A capable of parallel processing, the target CPU usage for executing a request to allocate guest memory 195A to a balloon 197A may be the percentage of CPU time that each individual VCPU 190A of the one or more VCPUs 190A of the virtual machine 170A should spend in executing the request to allocate the guest memory 195A.

In an example embodiment, the hypervisor 180 may determine a target CPU usage of a virtual machine 170A in responding to a request to deallocate guest memory 195A. In an example embodiment, the hypervisor 180 may determine a target CPU usage of a virtual machine 170A in responding to a request to deflate a balloon 197A (for example, deallocating guest memory 195A and then removing it from a balloon 195A).

The hypervisor 180 may then receive a first balloon request, where the first balloon request requests a first quantity of guest memory 195A to be ballooned (block 520). In an example embodiment, the first balloon request may be sent to the hypervisor 180 by at least one of: a host operating system 186, a guest OS 196A-B process, a host OS 186 process, a guest application 198A-D, a host application, a guest device (e.g., VCPU 190A-D, VMD 192A-B, VI/O devices 194A-D, etc.), a host device (e.g., CPU 120A-C, MD 130A-C, I/O 140A-B, etc.), a different guest OS 196B, a different virtual machine 170B, or a different host OS (not illustrated).

In an example embodiment, the first balloon request may be a request to allocate guest memory 195A to a balloon 197A (otherwise referred to as a request to inflate a balloon or a request for a quantity of memory to be ballooned). In an example embodiment, the first balloon request may be a request to deallocate guest memory 195A from a balloon 197A (otherwise referred to as a request to deflate a balloon). In an example embodiment, the first balloon request may specify a particular virtual machine 170A from which to balloon guest memory 195A or to which to return guest memory 195A that has previously been ballooned. In another example embodiment, the first balloon request may not specify a particular guest OS 196A or virtual machine 170A from which to balloon guest memory 195A or to which to return guest memory 195A that has previously been ballooned. This leaves the hypervisor 180 flexibility in determining which virtual machine 170A-B to which to send additional balloon requests requesting a quantity of guest memory 195A-B to be ballooned. For example, the hypervisor 180 may then determine a virtual machine 170A-B or guest OS 196A-B to which to send additional balloon requests requesting a quantity of guest memory 195A-B to be ballooned. In an example embodiment, the hypervisor 180 may make this determination responsive to a virtual machine 170A-B indicating that it has guest memory 195A-B available to be allocated to a balloon 197A-B.

In an example embodiment, the first quantity of guest memory 195A to be ballooned may be specified in bytes. In an example embodiment, the first quantity of guest memory 195A to be ballooned may be specified in a number of pages (e.g., a number of guest memory 195A pages 405). In an example embodiment, responsive to receiving the first balloon request, the hypervisor 180 may also determine a target time by which the first balloon request should be completed. In an example embodiment this target time may be provided to the hypervisor 180 by a system administrator or it may otherwise be based on a quality of service metric.

The hypervisor 180 then transmits to the virtual machine 170A a second balloon request, where the second balloon request requests a second quantity of guest memory 195A to be allocated to a balloon of the virtual machine 170A, and where the second quantity of guest memory 195A is a first fraction of the first quantity of guest memory 195A (block 530). In an example embodiment, the virtual machine 170A may specify to the hypervisor 180 a minimum, maximum, or target size of balloon requests. For example, the virtual machine 170A may send a message to the hypervisor 180 that balloon requests to the virtual machine 170A should be no greater than 1 MiB in size. In accordance with this instruction, the second quantity of guest memory 195A may be 1 MiB or less.

In an example embodiment, the second quantity of guest memory is greater than or equal to a single guest memory 195A page 405. In an example embodiment, the second quantity of guest memory is less than or equal to half the first quantity of guest memory 195A. In an example embodiment, the second quantity of guest memory may be ¼th, ⅒th, 1/16th, 1/64th, 1/100th, or any other fraction of the first quantity of guest memory 195A. In an example embodiment, if the first balloon request is a request for a first quantity of guest memory 195A to be deallocated from a balloon 195A, then the second balloon request may be a request for a second quantity of guest memory 195A to be deallocated from the balloon 195A of the virtual machine 170A, where the second quantity of guest memory 195A is a first fraction of the first quantity of guest memory 195A.

The hypervisor 180 then determines a first quantity of time that the virtual machine 170A took to execute the second balloon request (block 540). In an example embodiment, the hypervisor 180 determines the first quantity of time by timing the quantity of time that the virtual machine 170A takes to respond to the second balloon request (from the time the second balloon request was transmitted) with an indication that the second balloon request has been executed. In an example embodiment, the hypervisor 180 determines the first quantity of time by timing the quantity of time that the virtual machine 170A takes to respond to the second balloon request (from the time the second balloon request was transmitted) with at least one of an address of the allocated guest memory 195A and the size of the allocated guest memory 195A. In an example embodiment, the hypervisor 180 receives the first quantity of time from the virtual machine 170A responsive to the virtual machine 170A determining the quantity of time the virtual machine 170A or one or more of its VCPUs 190A took to execute the second balloon request. The present disclosure is not limited to the above examples and the hypervisor 180 may use other methods to determine the execution time of the second balloon request.

The hypervisor 180 then waits a second quantity of time, where the second quantity of time is approximately equal to the first quantity of time divided by the target CPU usage $$\left(\frac{\text{first quantity of time}}{\text{target } CPU \text{ usage}}\right)$$

(block 550). The hypervisor 180 then transmits to the virtual machine 170A, a third balloon request, where the third balloon request requests a third quantity of guest memory 195A to be allocated to the balloon 197A of the virtual machine 170A and where the third quantity of guest memory 195A is a second fraction of the first quantity of guest memory 195A (block 560).

In an example embodiment, the hypervisor 180 waits the second quantity of time substantially immediately after transmitting the second balloon request. In an example embodiment, the hypervisor 180 waits the second quantity of time substantially immediately after determining the first quantity of time that the virtual machine 170A took to execute the second balloon request. In an example embodiment, the hypervisor 180 waits the second quantity of time substantially immediately after receiving the first quantity of time from the virtual machine 170A. In an example embodiment, the hypervisor 180 may determine that the second quantity of time has elapsed by using a timer that alerts the hypervisor 180 when the timer expires. In an example embodiment, the hypervisor 180 transmits the third balloon request to the virtual machine 170A substantially immediately after waiting the second quantity of time.

In an example embodiment, the second quantity of time is equal to the first quantity of time divided by the target CPU usage and then subtracted by the first quantity of time $$\left(\frac{\text{first quantity of time}}{\text{target } CPU \text{ usage}} - \text{first quantity of time}\right).$$

In an example embodiment, the third quantity of guest memory 195A is the same size as the second quantity of guest memory 195A. In an example embodiment, the third quantity of guest memory 195A is a different size (e.g., smaller or larger) than the second quantity of guest memory 195A. In an example embodiment, the sum total of the second quantity of guest memory and the third quantity of guest memory equals the first quantity of guest memory. In another example embodiment, the first quantity of guest memory may be divided into smaller groups such that the sum total of the second quantity of guest memory and the third quantity of guest memory is less than the first quantity of guest memory. As described above, the virtual machine 170A may specify to the hypervisor 180 a minimum, maximum, or target size of balloon requests. The third quantity of guest memory 195A may be restricted or defined by the size identified by the virtual machine 170A.

In an example embodiment, responsive to sending the third balloon request, the hypervisor 180 further waits a third quantity of time, and then transmits to the virtual machine 170A a fourth balloon request, where the fourth balloon request requests a fourth quantity of guest memory 195A to be allocated to the balloon 197A of the virtual machine 170A, where the fourth quantity of guest memory 195A is a third fraction of the first quantity of guest memory 195A, and where the third quantity of time is approximately equal to the third quantity of guest memory divided by the second quantity of guest memory and multiplied by the second quantity of time $$\left(\frac{\text{third quantity of guest memory}}{\text{second quantity of guest memory}} \times \text{second quantity of time}\right).$$

For example, if the third quantity of guest memory 195A requested is twice as large as the second quantity of guest memory, then the hypervisor 180 will wait twice as long as it did when it sent the second balloon request (before sending the next request). Similarly, if the third quantity of guest memory 195A requested is half the size as the second quantity of guest memory, then the hypervisor 180 will wait half as long as it did when it send the second balloon request (before sending the next request).

In accordance with this example embodiment, the hypervisor 180 bases all subsequent wait times for future balloon requests to the virtual machine 170A on the second quantity of time and the second quantity of guest memory sent in the second balloon request. For example, after transmitting the fourth balloon request, the hypervisor 180 may wait a fourth quantity of time, where the fourth quantity of time is approximately equal to the fourth quantity of guest memory divided by the second quantity of guest memory and multiplied by the second quantity of time $$\left(\frac{\text{fourth quantity of guest memory}}{\text{second quantity of guest memory}} \times \text{second quantity of time}\right).$$

On the other hand, the hypervisor 180 may be designed to base wait times for all subsequent balloon requests to the virtual machine 170A on the most recent balloon request that was sent (rather than the second balloon request). In accordance with this example embodiment, responsive to sending the third balloon request, the hypervisor 180 further determines a third quantity of time that the virtual machine 170A took to execute the third balloon request, and waits a fourth quantity of time, wherein the fourth quantity of time is approximately equal to the third quantity of time divided by the target CPU usage $$\left(\frac{\text{third quantity of time}}{\text{target } CPU \text{ usage}}\right),$$

and then transmits to the virtual machine 170A, a fourth balloon request, wherein the fourth balloon request requests a fourth quantity of guest memory 195A to be allocated to the balloon 197A of the virtual machine 170A, wherein the fourth quantity of guest memory is third fraction of the first quantity of guest memory 195A.

In an example embodiment, the hypervisor 180 waits the fourth quantity of time substantially immediately after transmitting the third balloon request. In an example embodiment, the hypervisor 180 waits the fourth quantity of time substantially immediately after determining the third quantity of time that the virtual machine 170A took to execute the third balloon request. In an example embodiment, the hypervisor 180 waits the fourth quantity of time substantially immediately after receiving the third quantity of time from the virtual machine 170A. In an example embodiment, the hypervisor 180 may determine that the fourth quantity of time has elapsed by using a timer that alerts the hypervisor 180 when the timer expires. In an example embodiment, the fourth quantity of time is equal to the third quantity of time divided by the target CPU usage and then subtracted by the third quantity of time $$\left(\frac{\text{third quantity of time}}{\text{target } CPU \text{ usage}} - \text{third quantity of time}\right).$$

In an example embodiment, the fourth quantity of guest memory 195A is the same size as the third quantity of guest memory 195A. In an example embodiment, the fourth quantity of guest memory 195A is a different size (e.g., smaller or larger) than either the second or the third quantity of guest memory 195A. In an example embodiment, the sum total of the second quantity of guest memory, the third quantity of guest memory, and the fourth quantity of guest memory equals the first quantity of guest memory. In another example embodiment, the first quantity of guest memory may be divided into smaller groups such that the sum total of the second quantity of guest memory, the third quantity of guest memory, and the fourth quantity of guest memory is less than the first quantity of guest memory.

In an example embodiment, the hypervisor 180 continues to transmit balloon requests to the virtual machine 170A based on the first balloon request until the sum total of the quantities of guest memory 195A requested in all the balloon requests to the virtual machine 170A equal the quantity of guest memory requested by the first balloon request. In other words, the hypervisor 180 continues to transmit balloon requests to the virtual machine 170A until the first balloon request is fulfilled. In another example, the hypervisor 180 continues to transmit balloon requests to the virtual machine 170A until it receives an allocation error from the virtual machine indicating that the most recent balloon request cannot be fulfilled. In an example embodiment, they hypervisor 180 may then indicate to the source of the first balloon request one of: the first balloon request has been entirely fulfilled, the first balloon request has been partially fulfilled (and optionally that there was an allocation error), or that the first balloon request could not be fulfilled.

By way of example, the hypervisor 180 may determine that a target CPU usage of virtual machine 170A in responding to a request to allocate guest memory 195A should be 10%. The hypervisor 180 may then receive a first balloon request for 100 MiB of guest memory to be ballooned. The hypervisor 180 may then transmit to a virtual machine 170A a second balloon request for 10 MiB of guest memory 195A to be allocated to a balloon 197A. The virtual machine 170A may then execute the second balloon request and indicate to the hypervisor 180 that it took 3 ms to execute the second balloon request. Using this information, the hypervisor 180 may then wait 27 ms $$\left(\frac{3 \text{ ms}}{10\%} - 3 \text{ ms}\right)$$

(or may wait approximately 30 ms $$\left(\frac{3 \text{ ms}}{10\%}\right))$$

before transmitting to the virtual machine 170A a third balloon request for 15 MiB of memory to be allocated to a balloon 197A. The virtual machine 170A may then execute the third balloon request and indicate to the hypervisor 180 that it took 5 ms to execute the second balloon request and using this information the hypervisor 180 may then wait 45 ms $$\left(\frac{5 \text{ ms}}{10\%} - 5 \text{ ms}\right)$$

(or may wait approximately 50 ms $$\left(\frac{5 \text{ ms}}{10\%}\right))$$

before transmitting to the virtual machine 170A a fourth balloon request. In this manner, the hypervisor 180 may determine an appropriate wait time after each balloon request that it sends based on the execution time of the most recent balloon request. Alternatively, the hypervisor 180 may determine wait times for all subsequent balloon requests that it sends based on the execution time of the second balloon request. For example, based on the fact that the virtual machine took 3 ms to execute the second balloon request, if the third balloon request the hypervisor 180 sends to the virtual machine 170A is the same 10 MiB size, the hypervisor 180 may wait the same 27 ms $$\left(\frac{10 \text{ } MiB}{10 \text{ } MiB} \times 27 \text{ ms}\right)$$

(or 30 ms as alternatively described above $$\left(\frac{10 \text{ } MiB}{10 \text{ } MiB} \times 30 \text{ ms}\right))$$

described above before transmitting a fourth balloon request. On the other hand, if the third balloon request the hypervisor 180 sends to the virtual machine 170A requests half the quantity of guest memory 195A as the second balloon request (5 MiB), then the hypervisor 180 may wait approximately 13.5 ms $$\left(\frac{5 \text{ } MiB}{10 \text{ } MiB} \times 27 \text{ ms}\right)$$

(or 15 ms as alternatively described above $$\left(\frac{5 \text{ } MiB}{10 \text{ } MiB} \times 30 \text{ ms}\right))$$

before transmitting a fourth balloon request. The hypervisor 180 may then continue to send balloon requests to the virtual machine 170A in this manner until the first request is fulfilled or until the hypervisor 180 receives an allocation error.

In this manner, by managing and reducing the size of ballooning requests to a virtual machine 170A and by managing the frequency at which such ballooning requests are provided to a virtual machine 170A, the present disclosure ensures that the CPU usage for a given virtual machine 170A in executing requests to allocate guest memory 195A to a balloon 195A or deallocate guest memory 195A from a balloon 195A does not exceed a target CPU usage. This in turn reduces the extent to which the virtual machine 170A or its corresponding guest OS 196A is disrupted by such ballooning requests.

Figure 6:
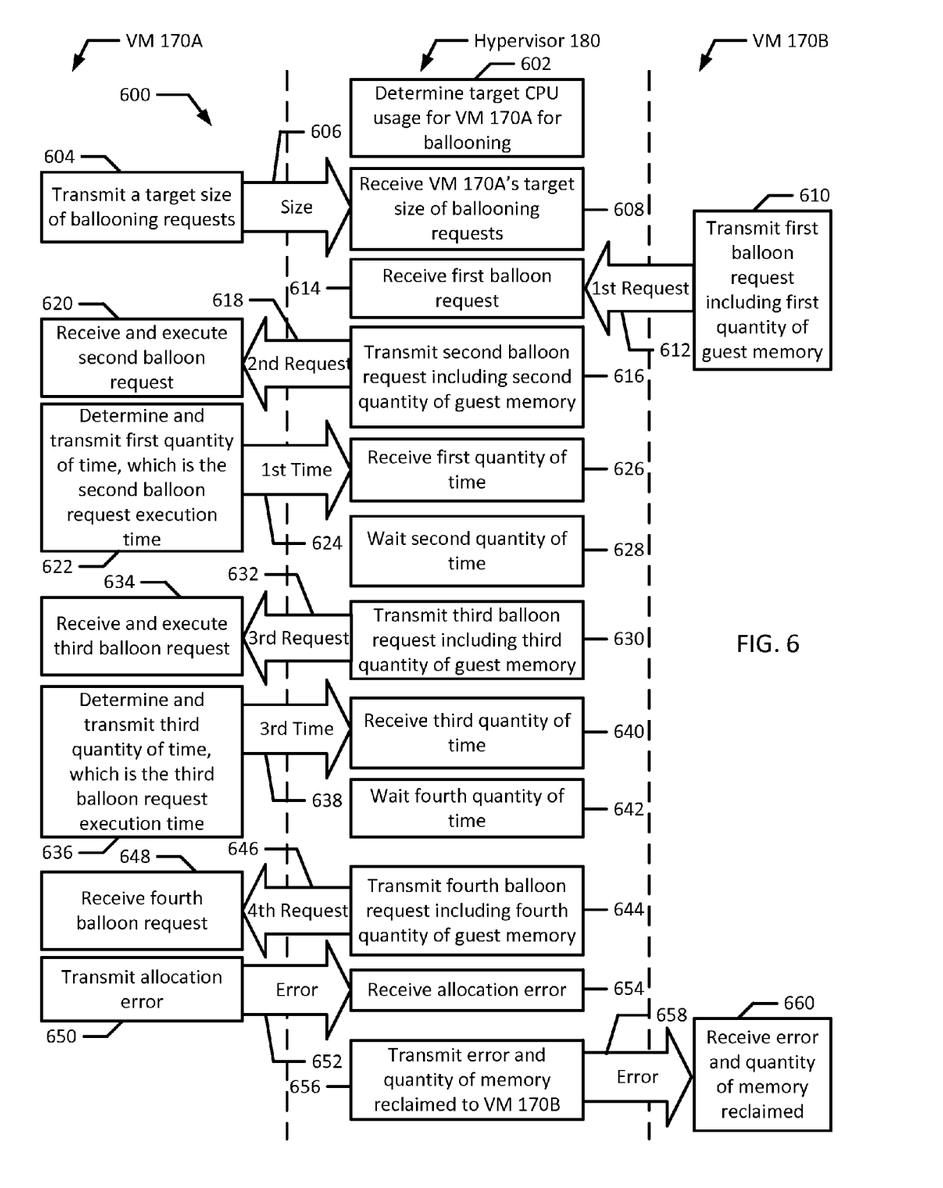
FIG. 6 is a flow diagram illustrating an example process for hypervisor driven gradual balloon inflation according to an example embodiment of the present disclosure.

FIG. 6 illustrates a flow diagram of an example method 600 for hypervisor driven gradual balloon inflation. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both.

The example method 600 starts and a hypervisor 180 determines a target CPU usage of a first virtual machine 170A in responding to a request to allocate guest memory 195A (block 602). For example, the hypervisor 180 may determine that the target CPU usage of the first virtual machine 170A for executing ballooning requests is 20%. The first virtual machine 170A may determine and transmit to the hypervisor 180 a target size of ballooning requests (blocks 604 and 606). In this manner, the first virtual machine 170A may specify to the hypervisor 180 a target size of guest memory 195A that the hypervisor 180 should request from the first virtual machine 170A at a given time. For example, the first virtual machine 170A may specify that balloon requests should be no greater than 1 MiB. The hypervisor 180 then receives the target size of ballooning requests (block 608). A second virtual machine 170B may determine that it needs to borrow a first quantity of guest memory and may transmit a first balloon request for the first quantity of guest memory to the hypervisor 180 (blocks 610 and 612). For example, the second virtual machine 170B may transmit to the hypervisor 180 a first balloon request for 5 GiB of guest memory to be ballooned.

The hypervisor 180 may then receive the first balloon request of guest memory to be ballooned (block 614). The hypervisor 180 may then determine that the first virtual machine 170A can potentially fulfill this request. In an example embodiment, the hypervisor 180 may then determine a size of balloon requests to transmit to the first virtual machine 170A. For example, this determination may be based on the target size of ballooning requests that the first virtual machine has specified to the hypervisor 180. The hypervisor 180 may then transmit a second balloon request, where the second balloon request requests a second quantity of guest memory 195A to be allocated to a balloon of the virtual machine 170A, and where the second quantity of guest memory 195A is a first fraction of the first quantity of guest memory 195A (blocks 616 and 618). For example, of the requested 5 GiB of guest memory, the second balloon request may be a request for 1 MiB of guest memory 195A to be allocated to the balloon 197A. The first virtual machine 170A then receives and executes the second balloon request (block 620). In executing the second balloon request, first virtual machine 170A may allocate unused guest memory 195A to the balloon 197A. For example, the first virtual machine 170A may allocate 1 MiB of unused guest memory 195A to the balloon 197A. The virtual machine 170A may then determine and transmit to the hypervisor 180 a first quantity of time that it took to execute the second balloon request (blocks 622 and 624). In an example embodiment, responsive to executing the second balloon request, the virtual machine 170A may further transmit an address of the guest memory 195A allocated to the balloon 197A and optionally the size of the guest memory 195A allocated to the balloon 197A to the hypervisor 180. The hypervisor 180 may then receive this first quantity of time (block 626). For example, the first virtual machine 170A may indicate to the hypervisor 180 that it took 0.2 ms to execute the second balloon request.

Responsive to receiving the first quantity of time, the hypervisor 180 may then wait a second quantity of time, where the second quantity of time is approximately equal to the first quantity of time divided by the target CPU usage $$\left(\frac{\text{first quantity of time}}{\text{target } CPU \text{ usage}}\right)$$

(block 628). The hypervisor 180 may then transmit to the virtual machine 170A, a third balloon request, where the third balloon request requests a third quantity of guest memory 195A to be allocated to the balloon 197A of the virtual machine 170A and where the third quantity of guest memory 195A is a second fraction of the first quantity of guest memory 195A (blocks 630 and 632). For example, the hypervisor 180 may wait approximately 1 ms $$\left(\frac{2 \text{ ms}}{20\%}\right)$$

and then transmit a third balloon request for another 1 MiB of guest memory 195A to be allocated to the balloon 197A.

The first virtual machine 170A then receives and executes the third balloon request (block 634). In executing the third balloon request, first virtual machine 170A may allocate unused guest memory 195A to the balloon 197A. For example, the first virtual machine 170A may allocate 1 MiB of unused guest memory 195A to the balloon 197A. The virtual machine 170A may then determine and transmit to the hypervisor 180 a third quantity of time that it took to execute the third balloon request (blocks 636 and 638). In an example embodiment, responsive to executing the third balloon request, the virtual machine 170A may further transmit an address of the guest memory 195A allocated to the balloon 197A and optionally the size of the guest memory 195A allocated to the balloon 197A to the hypervisor 180.

The hypervisor 180 may then receive this third quantity of time (block 640). For example, the first virtual machine 170A may indicate to the hypervisor 180 that it took 0.15 ms to execute the third request. Responsive to receiving the third quantity of time, the hypervisor 180 may then wait a fourth quantity of time, where the fourth quantity of time is approximately equal to the third quantity of time divided by the target CPU usage $$\left(\frac{\text{third quantity of time}}{\text{target CPU usage}}\right)$$

(block 642). The hypervisor 180 may then transmit to the virtual machine 170A, a fourth balloon request, where the fourth balloon request requests a fourth quantity of guest memory 195A to be allocated to the balloon 197A of the virtual machine 170A and where the fourth quantity of guest memory 195A is a third fraction of the first quantity of guest memory 195A (blocks 644 and 646). For example, the hypervisor 180 may wait approximately 0.75 ms $$\left(\frac{.15 \text{ ms}}{20\%}\right)$$

and then transmit a fourth balloon request for another 1 MiB of guest memory 195A to be allocated to the balloon 197A.

The first virtual machine 170A then receives the fourth balloon request (block 648). The first virtual machine 170A may determine that it does not have sufficient unused guest memory 195A to fulfill the fourth balloon request (i.e., allocate the requested guest memory to the balloon 197A). Responsive to this determination, the first virtual machine 170A may return an allocation error to the hypervisor 180 indicating that it was unable to fulfill the fourth balloon request (blocks 650 and 652). The hypervisor 180 may then receive the allocation error (block 654). Responsive to receiving the allocation error, the hypervisor 180 may indicate to the second virtual machine 170B the total quantity of guest memory successfully reclaimed and transmit an error notification indicating that no more guest memory 195A is available to be allocated from the first virtual machine 170A (blocks 656 and 658). The second virtual machine 170B may then receive this information from the hypervisor 180 (block 660).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   one or more physical processors;
   a hypervisor executing on the one or more physical processors; and
   a virtual machine, including a guest operating system (OS), executing on the one or more physical processors to:
   determine, by the hypervisor, a target CPU usage of the virtual machine in responding to a request to allocate guest memory;
   receive, by the hypervisor, a first balloon request, wherein the first balloon request requests a first quantity of guest memory to be ballooned;
   transmit, by the hypervisor to the virtual machine, a second balloon request, wherein the second balloon request requests a second quantity of guest memory to be allocated to a balloon of the virtual machine, wherein the second quantity of guest memory is a first fraction of the first quantity of guest memory;
   determine, by the hypervisor, a first quantity of time that the virtual machine took to execute the second balloon request; and
   wait a second quantity of time, wherein the second quantity of time is within a first range of time bounded by (i) the first quantity of time divided by the target CPU usage and (ii) the first quantity of time divided by the target CPU usage offset by the first quantity of time, and then transmit, by the hypervisor to the virtual machine, a third balloon request, wherein the third balloon request requests a third quantity of guest memory to be allocated to the balloon of the virtual machine, wherein the third quantity of guest memory is a second fraction of the first quantity of guest memory.

2. The system of claim 1, wherein the target CPU usage of the virtual machine is a percentage of CPU time that one or more CPUs of the virtual machine should spend in executing a request to allocate guest memory.

3. The system of claim 1, wherein the first balloon request is sent to the hypervisor by at least one of: a guest process, a host process, a guest application, a host application, a guest device, a host device, a second guest OS, a second virtual machine, and a host OS.

4. The system of claim 1, wherein the hypervisor further waits a third quantity of time, and then transmits to the virtual machine a fourth balloon request, wherein the fourth balloon request requests a fourth quantity of guest memory to be allocated to the balloon of the virtual machine, wherein the fourth quantity of guest memory is a third fraction of the first quantity of guest memory, and wherein the third quantity of time is within a second range of time bounded by (i) the third quantity of guest memory divided by the second quantity of guest memory and multiplied by the second quantity of time and (ii) the third quantity of guest memory divided by the second quantity of guest memory and multiplied by the second quantity of time offset by the by the first quantity of time.

5. The system of claim 1, wherein the hypervisor further determines a third quantity of time that the virtual machine took to execute the third balloon request, and waits a fourth quantity of time, wherein the fourth quantity of time is within a second range of time bounded by (i) the third quantity of time divided by the target CPU usage and (ii) the third quantity of time divided by the target CPU usage offset by the third quantity of time, and then transmits to the virtual machine, a fourth balloon request, wherein the fourth balloon request requests a fourth quantity of guest memory to be allocated to the balloon of the virtual machine, wherein the fourth quantity of guest memory is third fraction of the first quantity of guest memory.

6. The system of claim 1, wherein the sum total of the second quantity of guest memory and the third quantity of guest memory equals the first quantity of guest memory.

7. The system of claim 1, wherein the second quantity of time equals the first quantity of time divided by the target CPU usage and then subtracted by the first quantity of time.

8. A method, comprising:
determining, by a hypervisor executing on a computer system, a target CPU usage of a virtual machine in responding to a request to allocate guest memory;
receiving, by the hypervisor, a first balloon request, wherein the first balloon request requests a first quantity of guest memory to be ballooned;
transmitting, by the hypervisor to the virtual machine, a second balloon request, wherein the second balloon request requests a second quantity of guest memory to be allocated to a balloon of the virtual machine, wherein the second quantity of guest memory is a first fraction of the first quantity of guest memory;
determining, by the hypervisor, a first quantity of time that the virtual machine took to execute the second balloon request; and
waiting a second quantity of time, wherein the second quantity of time is within a first range of time bounded by (i) the first quantity of time divided by the target CPU usage and (ii) the first quantity of time divided by the target CPU usage offset by the first quantity of time, and then transmitting, by the hypervisor to the virtual machine, a third balloon request, wherein the third balloon request requests a third quantity of guest memory to be allocated to the balloon of the virtual machine, wherein the third quantity of guest memory is a second fraction of the first quantity of guest memory.

9. The method of claim 8, further wherein the target CPU usage of the virtual machine is a percentage of CPU time that one or more CPUs of the virtual machine should spend in executing a request to allocate guest memory.

10. The method of claim 8, wherein the first balloon request is sent to the hypervisor by at least one of: a guest process, a host process, a guest application, a host application, a guest device, a host device, a second virtual machine, and a host OS.

11. The method of claim 8, further comprising waiting, by the hypervisor, a third quantity of time, and then transmitting to the virtual machine a fourth balloon request, wherein the fourth balloon request requests a fourth quantity of guest memory to be allocated to the balloon of the virtual machine, wherein the fourth quantity of guest memory is a third fraction of the first quantity of guest memory, and wherein the third quantity of time is within a second range of time bounded by (i) the third quantity of guest memory divided by the second quantity of guest memory and multiplied by the second quantity of time and (ii) the third quantity of guest memory divided by the second quantity of guest memory and multiplied by the second quantity of time offset by the by the first quantity of time.

12. The method of claim 8, further comprising determining, by the hypervisor, a third quantity of time that the virtual machine took to execute the third balloon request, and waiting a fourth quantity of time, wherein the fourth quantity of time is within a second range of time bounded by (i) the third quantity of time divided by the target CPU usage and (ii) the third quantity of time divided by the target CPU usage offset by the third quantity of time, and then transmitting, by the hypervisor to the virtual machine, a fourth balloon request, wherein the fourth balloon request requests a fourth quantity of guest memory to be allocated to the balloon of the virtual machine, wherein the fourth quantity of guest memory is third fraction of the first quantity of guest memory.

13. The method of claim 8, wherein the sum total of the second quantity of guest memory and the third quantity of guest memory equals the first quantity of guest memory.

14. The method of claim 8, wherein the second quantity of time equals the first quantity of time divided by the target CPU usage and then subtracted by the first quantity of time.

15. A computer-readable non-transitory storage medium comprising executable instructions that, when executed by a computer system, cause the computer system to:
determine, by a hypervisor executing on a computer system, a target CPU usage of a virtual machine in responding to a request to allocate guest memory;
receive, by the hypervisor, a first balloon request, wherein the first balloon request requests a first quantity of guest memory to be ballooned;
transmit, by the hypervisor to the virtual machine, a second balloon request, wherein the second balloon request requests a second quantity of guest memory to be allocated to a balloon of the virtual machine, wherein the second quantity of guest memory is a first fraction of the first quantity of guest memory;
determine, by the hypervisor, a first quantity of time that the virtual machine took to execute the second balloon request; and
wait a second quantity of time, wherein the second quantity of time is within a first range of time bounded by (i) the first quantity of time divided by the target CPU usage and (ii) the first quantity of time divided by the target CPU usage offset by the first quantity of time, and then transmit, by the hypervisor to the virtual machine, a third balloon request, wherein the third balloon request requests a third quantity of guest memory to be allocated to the balloon of the virtual machine, wherein the third quantity of guest memory is a second fraction of the first quantity of guest memory.

16. The computer-readable non-transitory storage medium of claim 15, wherein the target CPU usage of the virtual machine is a percentage of CPU time that one or more CPUs of the virtual machine should spend in executing a request to allocate guest memory.

17. The computer-readable non-transitory storage medium of claim 15, wherein the first balloon request is sent to the hypervisor by at least one of: a guest process, a host process, a guest application, a host application, a guest device, a host device, a second virtual machine, and a host OS.

18. The computer-readable non-transitory storage medium of claim 15, wherein the hypervisor further waits a third quantity of time, and then transmits to the virtual machine a fourth balloon request, wherein the fourth balloon request requests a fourth quantity of guest memory to be allocated to the balloon of the virtual machine, wherein the fourth quantity of guest memory is a third fraction of the first quantity of guest memory, and wherein the third quantity of time is within a second range of time bounded by (i) the third quantity of guest memory divided by the second quantity of guest memory and multiplied by the second quantity of time and (ii) the third quantity of guest memory divided by the second quantity of guest memory and multiplied by the second quantity of time offset by the by the first quantity of time.

19. The computer-readable non-transitory storage medium of claim 15, wherein the hypervisor further determines a third quantity of time that the virtual machine took to execute the third balloon request, and waits a fourth quantity of time, wherein the fourth quantity of time is within a second range of time bounded by (i) the third quantity of time divided by the target CPU usage and (ii) the third quantity of time divided by the target CPU usage offset by the third quantity of time, and then transmits to the virtual machine, a fourth balloon request, wherein the fourth balloon request requests a fourth quantity of guest memory to be allocated to the balloon of the virtual machine, wherein the fourth quantity of guest memory is third fraction of the first quantity of guest memory.

20. The computer-readable non-transitory storage medium of claim 15, wherein the sum total of the second quantity of guest memory and the third quantity of guest memory equals the first quantity of guest memory.

* * * * *